(12) United States Patent
Furuse et al.

(10) Patent No.: US 7,865,963 B2
(45) Date of Patent: Jan. 4, 2011

(54) CHARACTER INFORMATION GENERATING APPARATUS AND METHOD, CHARACTER INFORMATION DISPLAYING APPARATUS AND METHOD, DIGITAL MOVIE SCREENING METHOD AND SYSTEM, AND SUBTITLE DISPLAY APPARATUS

(75) Inventors: Hiroyasu Furuse, Kanagawa (JP); Hiroshi Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1288 days.

(21) Appl. No.: 11/411,501

(22) Filed: Apr. 26, 2006

(65) Prior Publication Data

US 2006/0245806 A1    Nov. 2, 2006

(30) Foreign Application Priority Data

Apr. 28, 2005  (JP) ............................ P2005-132846

(51) Int. Cl.
*H04N 7/00* (2006.01)
*H04N 7/16* (2006.01)
*H04N 5/45* (2006.01)

(52) U.S. Cl. .................. 726/27; 380/239; 348/467; 348/565; 386/95

(58) Field of Classification Search .................. None
See application file for complete search history.

(56) References Cited

U.S. PATENT DOCUMENTS 6,046,778 A * 4/2000 Nonomura et al. .......... 348/565

| | | | |
|---|---|---|---|
| 6,856,317 B2 * | 2/2005 | Konsella et al. | 345/471 |
| 7,499,545 B1 * | 3/2009 | Bagshaw | 380/212 |
| 7,567,671 B2 * | 7/2009 | Gupte | 380/239 |
| 2001/0030710 A1 * | 10/2001 | Werner | 348/467 |
| 2004/0081434 A1 * | 4/2004 | Jung et al. | 386/95 |
| 2004/0177056 A1 | 9/2004 | Davis et al. | |

FOREIGN PATENT DOCUMENTS

| JP | 11 184856 | 7/1999 |
|---|---|---|
| JP | 2003 39752 | 2/2003 |
| JP | 2003 48347 | 2/2003 |

* cited by examiner

*Primary Examiner*—Kaveh Abrishamkar
(74) *Attorney, Agent, or Firm*—Frommer Lawrence & Haug LLP; William S. Frommer; Thomas F. Presson

(57) ABSTRACT

A digital movie screening system in which a movie subtitle can easily be used with protection of the copyright on the subtitle. A character information generating apparatus includes an encryption unit to encrypt a font file including data for displaying characters in a specific font, and a character information file generator to generate a character information file including a main file describing therein text data representing the content of characters to be displayed on a display unit and control data for displaying the characters and a font file encrypted by the encryption unit. The character information file generator also describes, in the main file, information on whether a font file indicated with a pointer, if any, described in the main file is an encrypted file.

15 Claims, 10 Drawing Sheets

CHARACTER INFORMATION GENERATING APPARATUS AND METHOD, CHARACTER INFORMATION DISPLAYING APPARATUS AND METHOD, DIGITAL MOVIE SCREENING METHOD AND SYSTEM, AND SUBTITLE DISPLAY APPARATUS

CROSS REFERENCES TO RELATED APPLICATIONS

The present invention contains subject matter related to Japanese Patent Application JP 2005-132846 filed in the Japanese Patent Office on Apr. 28, 2005, the entire content of which is incorporated herein by reference.

BACKGROUND OF THE INVENTION

1. Field of the Invention

The present invention relates to an apparatus for, and a method of, generating character information for display on a display apparatus, an apparatus for, and a method of, displaying the character information, a method of, and a system for, displaying a subtitle, and a subtitle generating apparatus destined for use to screen a digital movie.

2. Description of the Related Art

Recently, there has been widely prevalent a digital movie screening system in which a movie using no film but digital data as a picture source is projected on a large screen. The Digital Cinema Initiatives, LLC (DCI) of the industry group of major motion picture companies in USA proposed a digital movie standard (the home page of the LCC (DCI) at Web site address URL: http//www.dcimovies.com/ was on-line accessed on Apr. 28, 2005).

According to the digital movie standard proposed by the DCI, still pictures in a picture image format of 2000 (1920 H×1080 V) by 4000 (4096 H×2160 V) pixels are to be encoded at a rate of 24 pictures/sec on the basis of the JPEG 2000.

Also, the DCI proposed a specification under which subtitles to be superimposed on pictures are formed into a file separately from picture data and provided to users (movie theater) and the user combines the pictures and subtitles together for screening there.

The specification is under standardization in detail by the subcommittee "Digital Cinema Technology" (DC 28) of the Technology Committees of the SMPTE (Society of Motion Picture and Television Engineers) (the home page of the SMPTE at Web site address URL:http://www.smpte.org/engineering_committees/technology_committees/ was accessed on Apr. 28, 2005).

A subtitle file provided as a data source for the digital movie screening system includes an XML file including text data and control data for the text data, and a font file for displaying the text data. The XML file has described therein a pointer to indicate a font file. The subtitle display apparatus reads font data in the font file as necessary for displaying a subtitle.

SUMMARY OF THE INVENTION

The subtitle fonts used in movies are very special ones. Currently, they are exclusively used in the field of movies.

However, the copyright on the font file is not strictly managed in screening a digital movie. Since use of "movie subtitle fonts" is not easily permitted by the font creator (holder of copyright on the fonts), so it is necessary to use, instead of such "movie subtitle fonts", the general-purpose fonts used in the personal computers (PC) and not strictly managed under the copyright.

On the other hand, the content creators as producers of movies believe that the subtitle fonts form a part of their image presentation and wish to use special fonts peculiar to subtitle representations. However, the font makers have not permitted the content creators to use such special fonts in their subtitle representations.

Also, in screening a movie with conventional general-purpose fonts, the content creator wanting to promote digital screening of a movie or the like has been compelled in the past to make a screening inferior in quality to that with a film having subtitle-dedicated fonts printed thereon. The inferiority in quality of the subtitles in the digital movie screening to those in film movie screening has been taken as a problem by the movie promoters and movie lovers, and counted as one of the hurdles those engaged in promotion of digital movie screening have to overcome.

With the digitalization of movie subtitles and similar subtitles, the font makers having the intellectual property right on the subtitle fonts have been in anticipation of an expanded business chance. In the conventional digital movie screening system, however, since a font file as a literary work itself is to be delivered, it has been difficult for the font makers to permit the use of the subtitle fonts. Also, since the subtitle fonts are special fonts limited in application, permission of a subtitle font distribution in which the copyright on the subtitle fonts is not strictly managed will not lead to any business.

The movie subtitles in film-screened movies are unique and different from one movie piece to another. The movie fans have a very large interest in representation of the movie subtitles, and thus the current digital move screening system not capable of such representation is not acceptable by the movie fans. Thus, the movie screening sides such as the movie theaters and movie distributors do not prefer to screen a digital movie. This is a cause to prevent the digital movies from being prevalent.

It is therefore desirable to overcome the above-mentioned drawbacks of the related art by providing a character information generating apparatus and method in which special fonts can easily be used safely, a character information displaying apparatus and method, a digital movie screening method and system in which subtitle fonts including special fonts can easily be used, and a subtitle display apparatus.

According to the present invention, there is provided a character information generating apparatus, including:

an encryption unit to encrypt a font file including data for displaying characters in a specific font; and a character information file generator to generate a character information file including a main file having described therein text data representing the content of characters to be displayed on a display unit and control data for displaying the characters and a font file encrypted by the encryption unit, the character information file generator also describing, in the main file, information on whether a font file indicated with a pointer, if any, described in the main file in an encrypted one.

According to the present invention, there is also provided a character information generating method, including the steps of:

encrypting a font file including data for displaying characters in a specific font;

generating a character information file including a main file having described therein text data representing the content of characters to be displayed on a display unit and control data for displaying the characters and an encrypted font file; and describing, in the main file, information on whether a font file indicated with a pointer, if any, described in the main file is an encrypted one.

According to the present invention, there is also provided a character information display apparatus, including:

a display unit capable of displaying at least character information; and a file acquisition unit to acquire, from a recording medium or network, a character information file including a main file having described therein text data representing the content of characters and control data for displaying the characters and an encrypted font file; and a decryption controller to decrypt the character information file acquired by the file acquisition unit and display characters in a predetermined font, obtained by decryption, the main file having described therein a pointer to indicate a font file and information on whether the font file indicated with the pointer is an encrypted one; and the decryption controller decrypting, in case the main file has described therein the information that the font file is the encrypted one, the font file with an encrypt key when the characters in that font are to be displayed.

According to the present invention, there is also provided a character information displaying method in which there is acquired, from a recording medium or network, a character information file including a main file having described therein text data representing the content of characters and control data for displaying the characters and an encrypted font file, the acquired character information is decrypted and characters in a predetermined font, obtained by decryption, are displayed on a display unit, wherein:

the main file has described therein a pointer to indicate a font file and information on whether the font file indicated with the pointer is an encrypted one; and in case the main file has described therein the information that the font file is the encrypted one, the font file is decrypted with an encrypt key when the character in that font is to be displayed.

According to the present invention, there is also provided a digital movie screening method in which a content creator creates a picture file and subtitle file for a movie and a user decrypts the picture file and subtitle file, combines the decrypted picture and subtitle with each other and shows the synthetic picture/subtitle on a screen, wherein:

the subtitle includes a main file having described therein text data representing the content of characters to be displayed as a movie subtitle and control data for displaying a subtitle and one or more font files including font data on the text data; and the content creator encrypts the font file and provides the subtitle file including the encrypted font file to the user.

According to the present invention, there is also provided a digital movie screening system, including:

a content creator-side system to create a picture file and subtitle file for a movie; and a user-side system to decrypt the picture file and subtitle file supplied from the content creator-side system, combine the decrypted picture and subtitle with each other and showing the synthetic picture/subtitle on a screen, the subtitle including a main file having described therein text data representing the content of characters to be displayed as a movie subtitle and control data for displaying a subtitle and one or more font files including font data on the text data; and the content creator-side system encrypting the font file and providing the subtitle file including the encrypted font file to the user.

According to the present invention, there is also provided a subtitle display apparatus destined for use in a digital movie screening system in which a content creator creates a picture file and subtitle file for a movie and a user decrypts the picture file and subtitle file, combines the decrypted picture and subtitle with each other and shows the synthetic picture/subtitle on a screen, the subtitle display apparatus including:

a storage unit having a movie subtitle file stored therein; and a subtitle processor to decrypt the subtitle file and combine the decrypted subtitle with a picture of the movie, the subtitle including a main file having described therein text data representing the content of characters to be displayed as a movie subtitle and control data for displaying a subtitle and one or more encrypted font files including font data on the text data; and the subtitle processor including a cipher processor to decrypt the font file.

According to the present invention, a font file can be provided in an encrypted state to the user. Thus, special fonts can be used more easily. Also, subtitle fonts using special fonts can be used more easily in a digital cinema system.

DETAILED DESCRIPTION OF THE PREFERRED EMBODIMENTS

The present invention will be explained in detail below concerning a digital movie screening system as an embodiment thereof with reference to the accompanying drawings. It should be noted that the digital movie screening system going to be explained below is capable of screening a digital movie.

Overall Description

Figure 1:
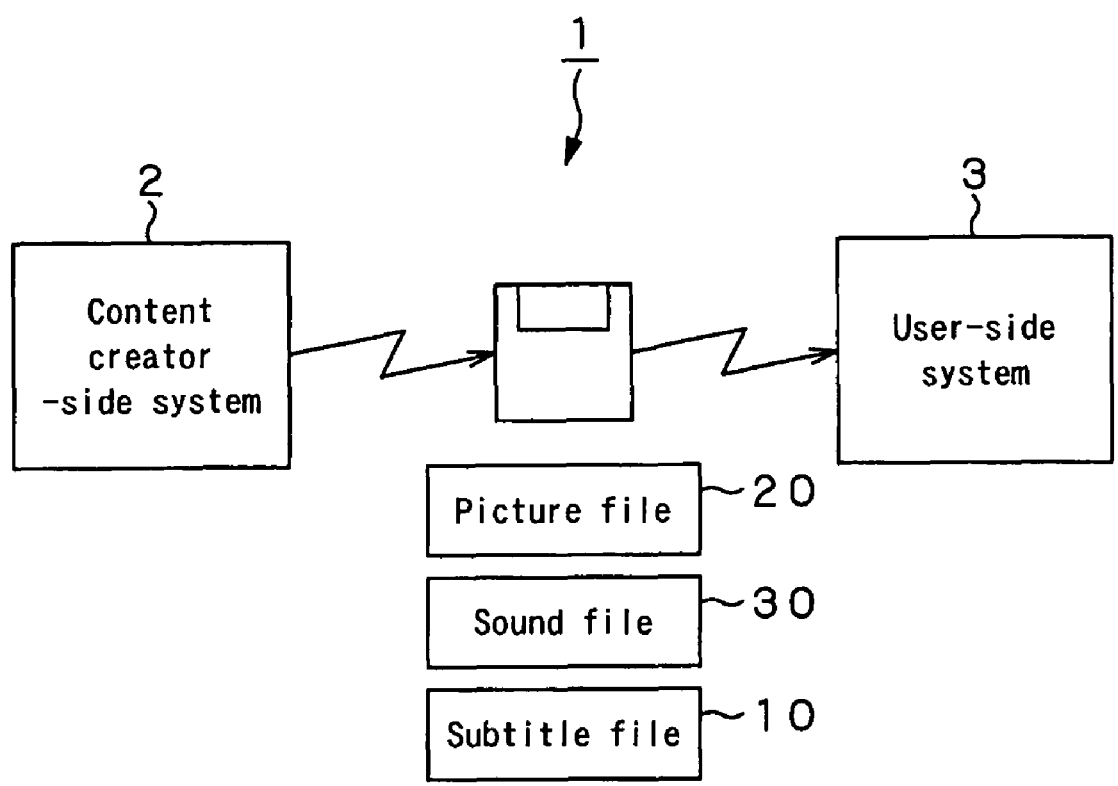
FIG. 1 schematically illustrates a digital movie screening system according to the present invention.
Figure 2:
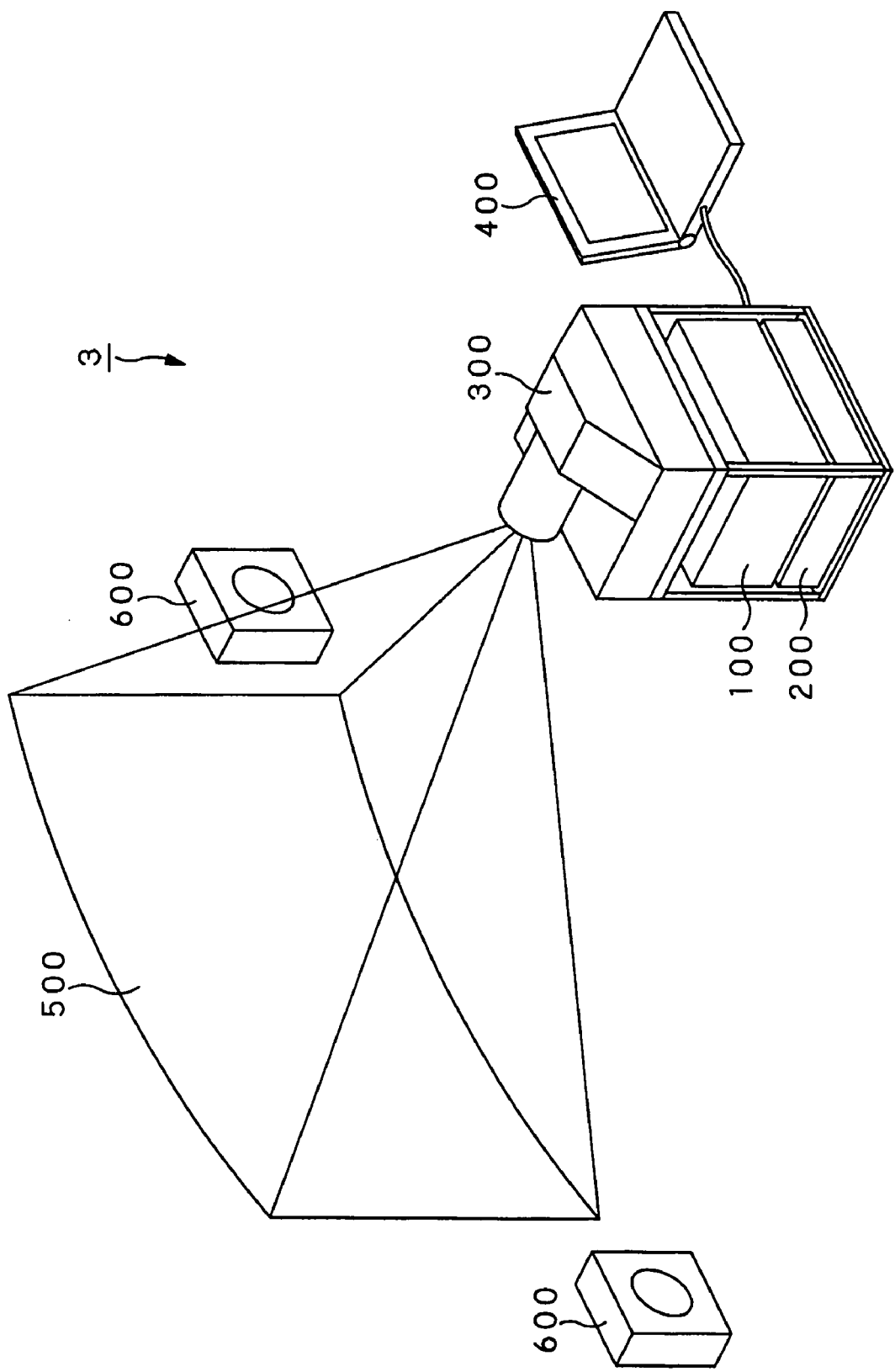
FIG. 2 schematically illustrates a user-side (movie theater-side) system of the digital movie screening system according to the present invention.
Figure 3:
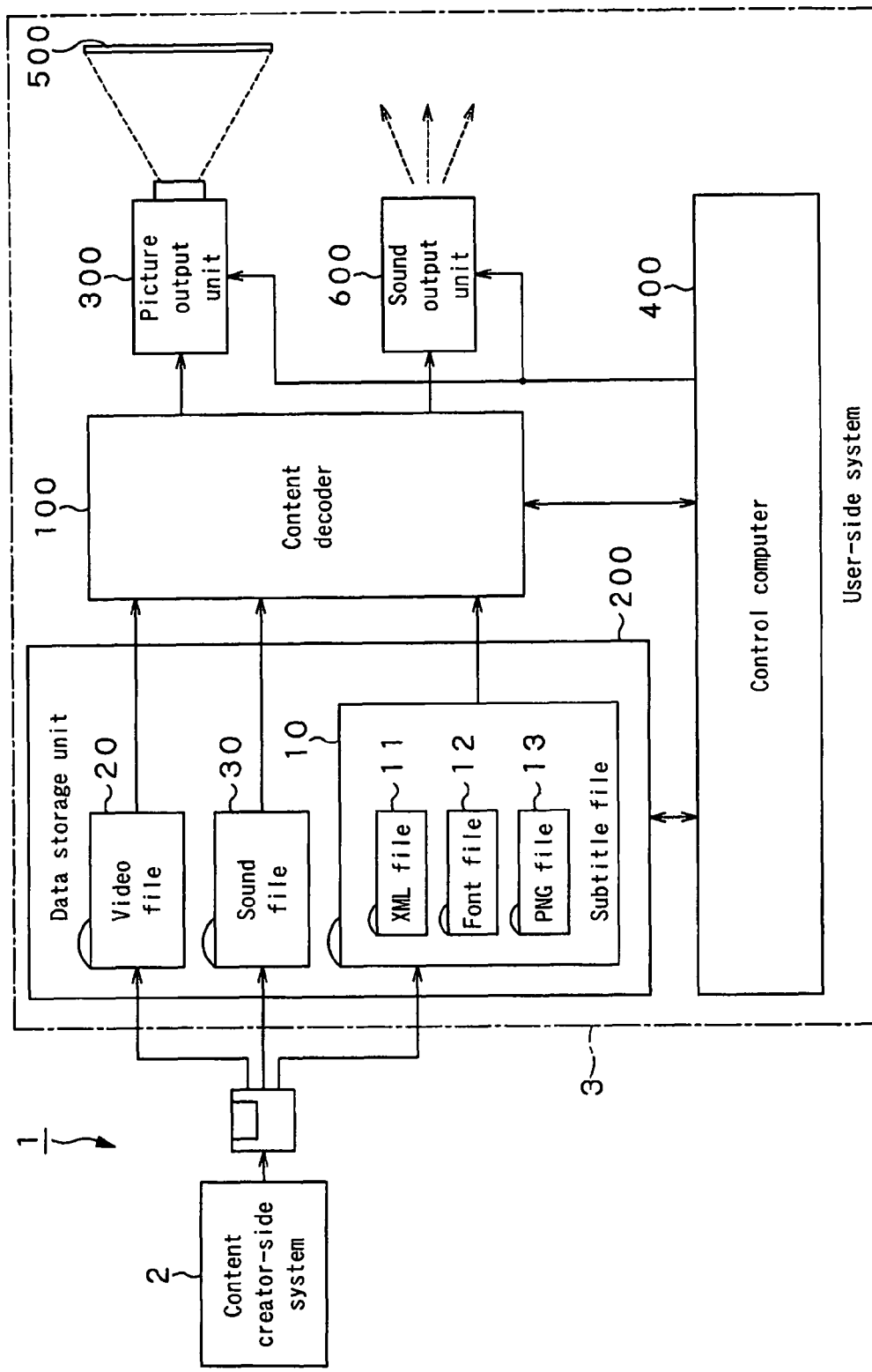
FIG. 3 is a schematic block diagram of the digital movie screening system.

Referring now to FIGS. 1 to 3, there is schematically illustrated the digital movie screening system according to the present invention. FIG. 1 schematically illustrates the entire construction of the digital movie screening system according to the present invention, FIG. 2 schematically illustrates a user-side (movie theater-side) system of the digital movie screening system, and FIG. 3 is a schematic block diagram of the digital movie screening system.

As shown in FIG. 1, the digital movie screening system, generally indicated with a reference numeral 1, includes a content creator-side system 2 to create a content and form it into data in a predetermined format, and a user-side system 3 equipped in a movie theater to show a digital movie on a screen.

As shown in FIGS. 2 and 3, the user-side system 3 includes a content decoder 100 to decode a picture, sound and subtitle from picture, sound and subtitle files as movie sources of pictures, sound and subtitles, a data storage unit 200 formed from a group of, for example, hard disks having the picture, sound and subtitle files as movie source stored thereon, a picture display unit 300 to project a picture decoded by the content decoder 100, a control computer 400 to control or otherwise operate the content decoder 100 from outside, a screen 500 on which a picture projected from the picture display unit 300 is shown, and a sound output unit 600 to output sound decoded by the content decoder 100.

Note that in order to keep the security of the picture, sound and subtitle files as the movie sources, the content decoder 100 and data storage unit 200 in the user-side system 3 are designed to give such security that no physical and electronic reference can be made to source data.

In the content creator-side system 2, a picture file 20, sound file 30 and subtitle file 10 are generated according to the SMPTE standard, and passed to the user-side system 3 via a recording medium or network. The picture file 20, sound file 30 and subtitle file 10 are sources for movie screening and takes the place of the conventional film. The picture file 20 contains data for displaying a picture, the sound file 30 contains data for outputting a sound, and the subtitle file 10 contains data for depicting a subtitle being superimposed on a picture.

As shown in FIG. 3, the subtitle file 10 consists of an XML file 11 as a main file, a font file 12 and PNG file 13.

The XML file 11 is described in XML (extensible markup language; one of the document markup languages). The XML file 11 has described therein text data representing letters and symbols to be displayed as a subtitle is described per element (per scene, for example) and also control data representing a display time, display position, font type, etc. per element when displaying the text data.

Also, the XML file 11 has described therein a pointer to indicate a location of the font file 12 having stored therein font data as the substance for displaying text data. The "pointer" is the name of the font file 12 or a storage location on a network such as URL in case the font file 12 is acquired via the network.

Also, the XML file 11 has described therein a pointer for PNG data (file name or location on the network, such as URL, in case the file is acquired via the network) and also control data representing the display time, display position, etc. per element for displaying the PNG data.

The font file 12 has stored therein the substance of a font for displaying text data as an image on the screen, for example, substantive data on a font, such as Gothic font. Many movies use special movie-dedicated fonts, not such ones as used in ordinary books and computers. The content creator will acquire a license for use of such fonts from a font creator and describe the fonts in the subtitle file.

In the case of the digital movie screening system according to the present invention, the font file 12 is encrypted for distribution at the content creator-side system 2, and decrypted for screening a movie at the user-side system 3.

The PNG file 13 has stored therein image data on special fonts, symbols, graphics, etc. not included in the font file 12 but prepared in the PNG form for displaying on the screen.

The aforementioned user-side system 3 receives the picture file 20, sound file 30 and subtitle file 10 from the content creator-side system 2, and stores them into the content storage unit 200.

When a movie screening is started, the picture file 20, sound file 30 and subtitle file 10 stored in the content storage unit 200 are read and decoded by the content decoder 100. The content decoder 100 decodes the picture file 20 to generate picture data having a subtitle combined therewith, and supplies the picture data to the picture display unit 300. The picture display unit 300 projects the supplied picture data onto the screen 500. Also, the content decoder 100 decodes the sound file 30 to generate sound data, and supplies the sound data to the sound output unit 600. The sound output unit 600 outputs the supplied sound data from a speaker.

Sending the Subtitle File

Figure 4:
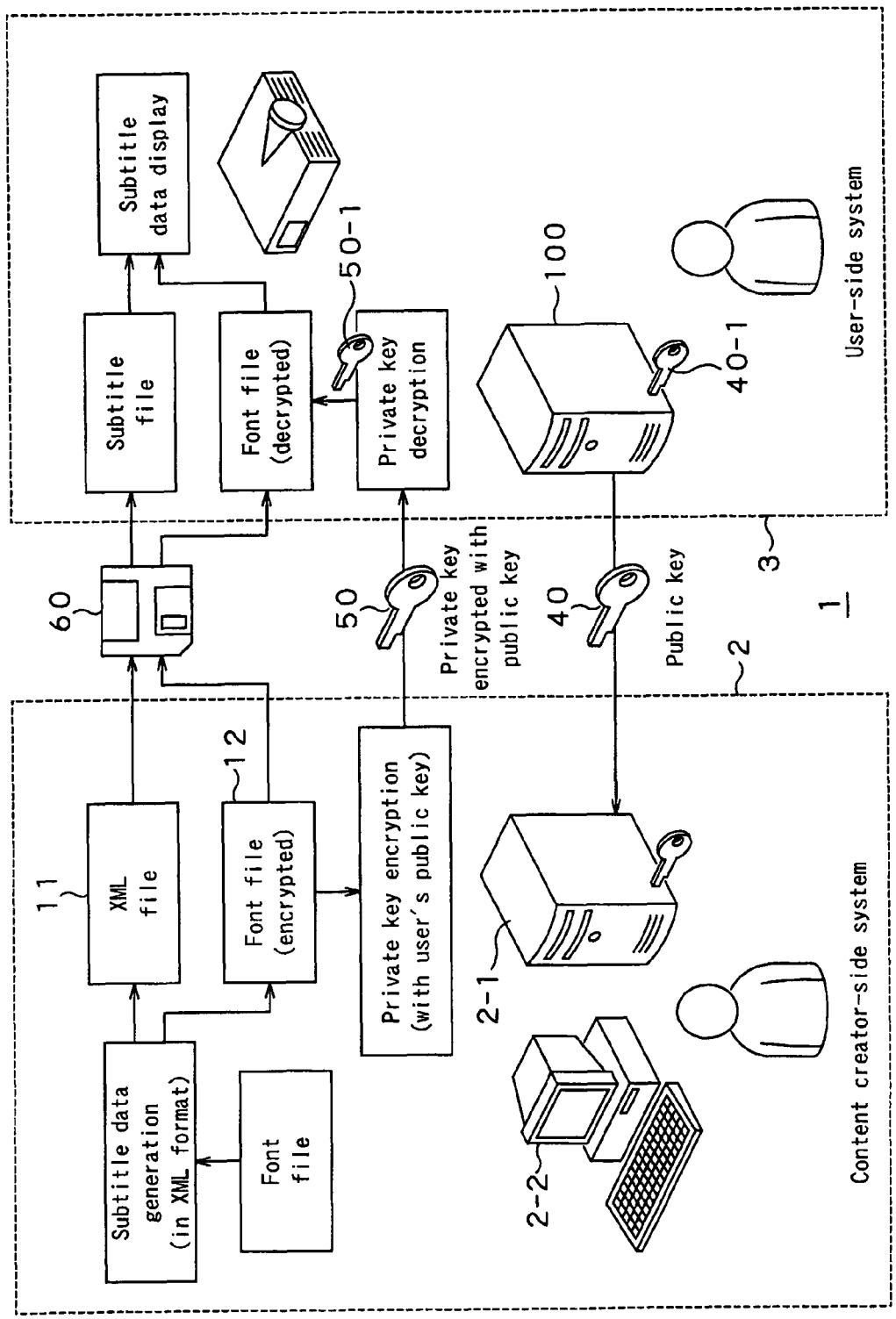
FIG. 4 explains the operations made in sending a subtitle file from a content creator-side system to the user-side system.

The subtitle file 10 is sent from the content creator-side system 2 to the user-side system 3 as will be described below with reference to FIG. 4.

The user-side system 3 has the content decoder 100 generate a public key 40, and sends it to the content creator-side system 2. The public key 40 may be encrypted by any of the techniques such as RSA cryptography, elliptic curve cryptography or the like. The public key 40 may be sent from the user-side system 3 to the content creator-side system 2 via either a recording medium or a network. The content creator-side system 2 receives the public key 40 sent from the user-side system 3, and stores it into a processor 2-1.

Using a subtitle data generator 2-2, the content creator creates the XML file 11 having subtitle data described therein.

In case the font file 12 is referred to in the description of the XML file 11, a pointer for the font file 12 (file name or network address) will be described in the XML file 11.

Further, in case the pointer for the font file 12 is described in the XML file 11, there is provided along with the pointer a field where it is described whether the font file 12 is an encrypted one (encryption specifying field). In case the font file 12 is to be sent in an encrypted state to the user-side system 3, it is described in the encryption specifying field of the XML file 11 that the font file 1 is an encrypted one. In case the font file 12 is provided without being encrypted to the user-side system 3, it will be described in the encryption specifying field that the font file has not been encrypted.

An example of the detail description in the XML file will be given below.

The subtitle data generator 2-2 generates the subtitle file 10 including the generated XML file 11 and font file 12 referred to in the XML file 11 and the PNG file 13 as necessary and send them to the processor 2-1.

The processor 2-1 interprets the encryption specifying field of the font file 12 in the subtitle font 10, and when it is necessary to encrypt the font file 12, the processor 2-1 encrypts the font file 12 with a private key cipher such as AES owned by itself. At the same time, it encrypts a private key 50 used for the encryption with the public key 40 received from the user-side system 3.

The content creator-side system 2 packages the XML file 11, encrypted font file 12 and PNG file 13 to generate the subtitle file 10, and stores the subtitle file thus generated into a recording medium 60. The content creator distributes the recording medium 60 to the user-side system 3. At the same time, the content creator also distributes the private key 50 for decryption of the font file 12 encrypted with the public key 40 of the user to the user-side system 3. The content creator may store the private key 50 for decryption of the font file 12 into the same recording medium 60 in which the subtitle file 10

(including the encrypted font file 12) is stored, and distribute it to the user-side system 3. Also, the subtitle file 10 (including the encrypted font file 12) and private key 50 may be distributed from the content creator-side system 2 to the user-side system 3 via a network.

Since the private key 50 for decryption of the font file 12 has been encrypted with the public key 40 of the user as above, a sufficient cryptosecurity can be assured by selecting the public key cryptography even if any third party has stolen the public key.

The user-side system 3 receives the recording medium 60 from the content creator, reads the subtitle file 10 (XML file 11, encrypted font file 12 and PNG file 13) from the recording medium 60, and stores it into the data storage unit 200 or the like. At the same time, the user-side system 3 receives the private key 50 for decryption of the font file 12 and stores it into the content decoder 100.

At the user-side system 3, the private key 50 for decryption of the encrypted font file 12 is decrypted with a private key 40-1 corresponding to the public key 40 and owned by the user-side system 3 to generate a private key 50-1 for decryption of the font file 12.

The user-side system 3 decrypts the encrypted font file 12 with the private key 50-1.

Using the XML file 11, decrypted font file 12 and PNG file 13, the user-side system 3 displays a subtitle by means of the picture display unit 300.

Detailed Description in the XML File

A detailed description in the XML format in the XML file 11 will be given by way of example below:

```
<?xml version="1.0" encoding="UTF-8"?>
<Subtitle Version="1.0">
    <ID>12345678-1234-401234-1234-12345678</ID>
    <ContentTitleText>Title of content</ContentTitleText>
    <IssueDate>2005-03-03T12:34:50Z</IssueDate>
    <ReelNumber>1</ReelNumber>
    <LanguageJapanese</Language>
    <LoadFont ID="Name of
font">12345678-1234-1234-1234-123456789012</LoadFont>
        <Font Encryption="yes">
        </Font>
            <Subtitle SpotNumber="1" TimeIn="00:00:00"
            TimeOut="00:00:07">
                <Text Direction="horizontal" HAlign="left"
                VAlign="bottom">Sample of
subtitle
            </Text>
        </Subtitle>
</Subtitle>
```

Each of items in the format in which the above XML file 11 is described has the following meaning.

The first line reads the version of the XML format. The second line reads the method of encoding the XML format. A subtitle is described in a field defined between <Subtitle . . . in the second line and </Subtitle> in the fifteenth line.

The third line reads the version of the subtitle file. An ID for the content is described in a field defined between <ID> and </ID> in the fourth line. A date on which the subtitle was issued is described in a field defined between <IssueDate> and </IssueDate> in the fifth line. A file number is described in a field defined between <<ReelNumber> and </ReelNumber> in the sixth line. The language of the subtitle is described in a field defined between <Language> and </Language> in the seventh line.

The name and pointer of a font file 12 to be used are described in a field defined between <LoadFont . . . and </LoadFont> in the eighth line.

In a field defined between <FontEncryption . . . in the ninth line and </Font> in the tenth line, it is described whether the font file 12 indicated with the pointer in the eighth line has been encrypted or not. That is, the description after <FontEncryption=is "encryption specifying field". In case YES is described after <FontEncryption=, the font file 12 has been encrypted. If <FontEncryption=is followed by NO, the font file 12 is not encrypted.

The eleventh to fourteenth lines describe the content of control data such as a text content to be displayed as a subtitle, display time, display position, etc. of the subtitle.

Also, other example of the description made in the XML format in the XML file 11 will be given below. In this example, the network refers to the encrypted data (Movie-Font.ttf.enc) in the font file 12 (MovieFont.ttf).

```
<?xml version="1.0" encoding="UTF-8"?>
<Subtitle Version="1.0">
    <ID>12345678-1234-401234-1234-12345678</ID>
    <ContentTitleText>Title of content</ContentTitleText>
    <IssueDate>2005-03-03T12:34:50Z</IssueDate>
    <ReelNumber>1</ReelNumber>
    <LanguageJapanese</Language>
    <LoadFont ID="Name of font">
        <EncryptedData
        xmlns='http://www.w3.org/2001/04/xmlenc#'
            xmlns:ds='http://www.w3.org/2000/09/xmldsig#'>
            <CipherData>
                <CipherReference
                URI="./Subtitle/font/MovieFont.ttf.enc">
                </CipherReference>
            </CipherData>
        </EncryptedData>
    </LoadFont>
        <Subtitle SpotNumber="1"
        TimeIn="00:00:00" TimeOut="00:00:07">
            <Text Direction="horizontal" HAlign="left"
            VAlign="bottom">Sample of
subtitle
        </Text>
    </Subtitle>
</Subtitle>
```

In the above example of description, the ninth to tenth lines provide an encryption specifying field. In this case, an address (URL) on the network is described in this field. That is, reference to the content described at this address will make it clear whether the font file is an encrypted one or not.

Further, in the above description example, the twelfth line reads an address on the network where the substance of the encrypted font file exists. For reference to the font file, it is necessary to download data from the address on the network.

Note that the field specifying the encryption of the font file is an element defined independently by an XML schemer. The encryption specifying field may not be defined independently but may be defined within the element <LoadFont . . . > in the eighth line. In this case, the element <LoadFont . . . > is described as follows:

<LoadFont ID=Name of Font>12345678·1234·1234·1234·123456789012 Encryption="yes"</LoadFont>

This example explains a description in a description language XML. However, the description language may not always be XML but may be any other language which can explicitly designate a font and describe whether the font is encrypted or not, such as HTML, SMIL or the like.

Procedure for Encryption and Display of a Subtitle (Package Type)

Next, the procedure for encrypting and displaying a subtitle in the package type digital movie screening system will be explained below with reference to flow diagrams in FIGS. 5 and 6.

Note that the "Package type" is such that the XML file 11 and font file 12 are packaged and provided to the content creator-side system 2 in advance.

The user-side system 3 generates the public key 40 in step S201, and it distributes the public key to the content creator-side system 2 in step S202.

Next in step S203, the content creator-side system 2 generates the XML file 11 as the main file for displaying a subtitle. In step S204, it prepares the font file 12. In step S205, it describes (embeds) a pointer for the font file 12 in the XML file 11. Next in step S206, the content creator-side system 2 describes (embeds) information on whether the font file 12 has been encrypted or not in the encryption specifying field of the XML file 11.

Next in step S207, the content creator-side system 2 encrypts the font file 12 with the private key the content creator holds.

Next in step S208, the content creator-side system 2 encrypts the private key used for the encryption with the public key received from the user.

Then in step S209, the content creator-side system 2 packages the XML file having the encryption information embedded therein and encrypted font file. That is, it generates the subtitle file 10 including the XML file 11 and font file 12. It should be noted that the XML file and encrypted font file may be packaged together with the PNG file 13. Also, not only the subtitle file 10 but also the picture file, sound file, etc. may be packed at the same time.

The content creator-side system 2 stores the subtitle file 10 packaged in step S209 and private key encrypted with the public key in step S208 into a recording medium, and sends the recording medium to the user-side system 3.

Note that the content creator-side system 2 may send the XML file 11 having the encryption information embedded therein and the encrypted font file 12 separately with omission of the operation in step S209 under the agreement with the user-side system 3. On the contrary, the private key encrypted with the user's public key may be included in the package of the XML file 11 having the encryption information embedded therein and encrypted font file 12. The XML file 11 and font file 12 may be distributed from the content creator-side system 2 to the user-side system 3 via a recording medium having the files 11 and 12 recorded therein as well as via a network.

In step S210, the user-side system 3 having received the XML file 11 and font file 12 stores the subtitle file (XML file 11 and encrypted font file 12) and a key for decryption of the encrypted font file 12 into its own storage unit.

In step S211, the user-side system 3 judges whether the font file 12 described in the XML file 11 is included in the package of the subtitle file 10.

Next, in case the font file 12 exists in the received subtitle file 10 (in case the result of judgment in step S210 is affirmative (YES)), the user-side system 3 goes to step S212 in which it will judge whether the encryption information is described in the XML file 11.

Next, in case the encryption information exists in the XML file 11 (in case the result of judgment in step S212 is affirmative (YES)), the user-side system 3 goes to step S213 in which it will decrypt the key received in step S210 with the corresponding private key as a pair with the public key of the user.

Then, in case the key has successfully been decrypted (the result of judgment in step S213 is affirmative (YES)), he user-side system 3 goes to step S214 in which it will decrypt the font file 12 with the decrypted key.

Next, in case the font file 12 has successfully been decrypted (in case the result of judgment in step S214 is affirmative (YES)), the user-side system 3 goes to step S215 in which it will generate a subtitle using the decrypted font file 12.

On the contrary, if the font file 12 does not exist (in case the result of judgment in step S211 is negative (NO)), if no encryption information exists (in case the result of judgment in step S212 is negative (NO)), if the key has not successfully been decrypted (in case the result of judgment in step S213 is negative (NO)) or if the encrypted font file 12 has not successfully been decrypted (in case the result of judgment in step S214 is negative (NO)), the user-side system 3 goes to step S216 in which it will generate a subtitle using a local font the user's processor has.

Then in step S217, the user-side system 3 combines the subtitle generated in step S215 or S216 with a picture, and displays the synthetic image on the picture display unit 300.

Procedure for Encrypting and Displaying a Subtitle (Network Type)

Figure 7:
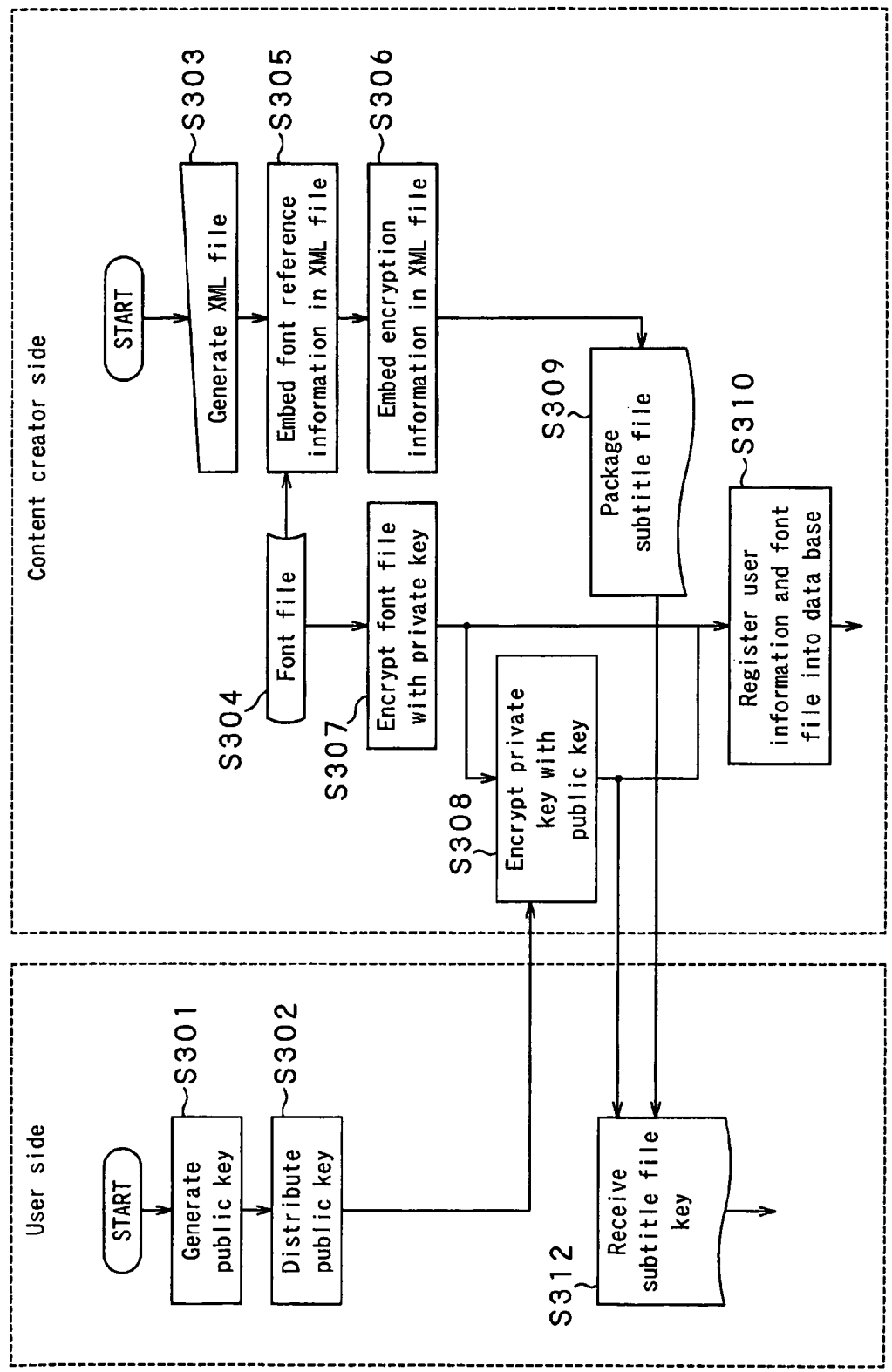
FIG. 7 shows a flow of operations made in subtitle encryption and subtitle display in a network type digital movie screening system.
Figure 8:
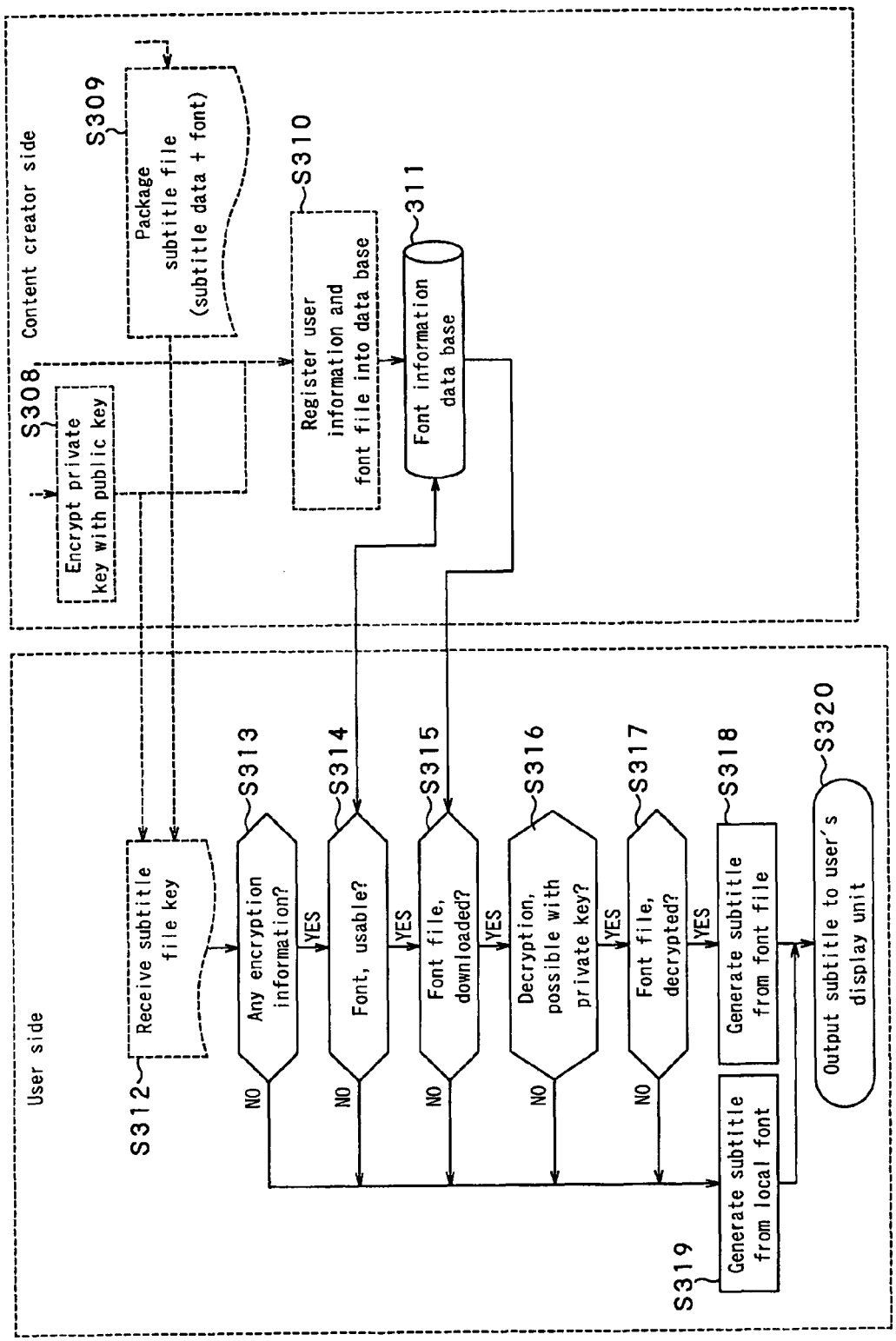
FIG. 8 is a flow diagram continued from that in FIG. 7.

The subtitle is encrypted and displayed in the network type digital movie screening system as will be described below with reference to FIGS. 7 and 8.

In the package type digital movie screening system, the font file 12 has to be passed from the content creator-side system 2 to the user-side system 3 in advance. However, some of the people holding the copyright on the font file 12 will feel disinclined to the distribution of the encrypted font file 12 to the users even if the font file 12 is an encrypted one. Also, it is difficult for the copyright holder of the font file 12 to have a real-time knowledge of how the font tile 12 is in use.

Figure 5:
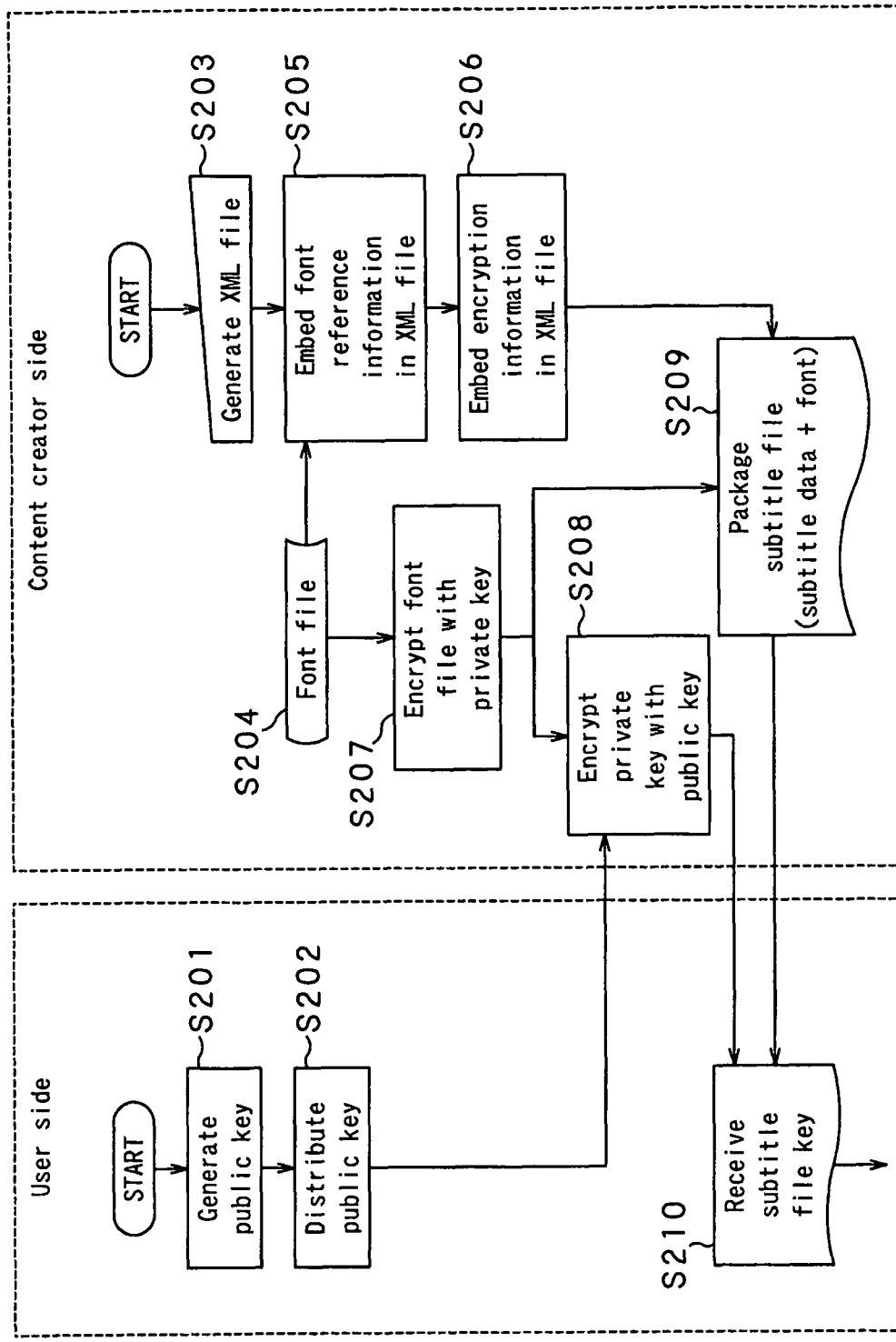
FIG. 5 shows a flow of operations made in subtitle encryption and subtitle display in a package type digital movie screening system.
Figure 6:
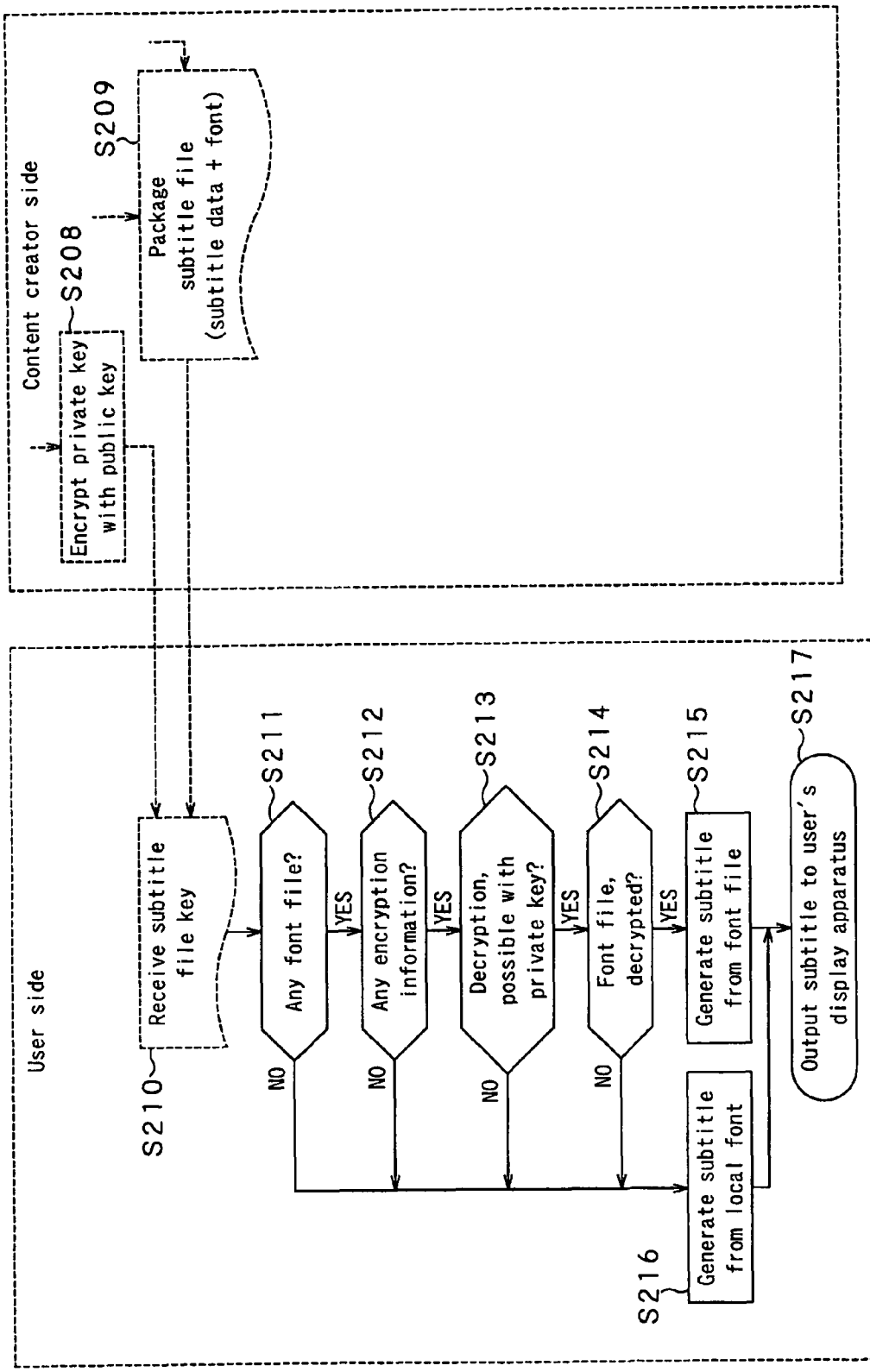
FIG. 6 is a flow diagram continued from that in FIG. 5.

The above problem can be solved by the network type digital movie screening system which will be explained herebelow:

Note that operations in steps S301 to S308 are the same as those in steps S201 to S208 in FIGS. 5 and 6 showing the operations made in the package type digital movie screening system.

In step S309, the content creator-side system 2 packages the XML file 11 having encryption information embedded therein as the subtitle file 10. At this time, the font file 12 is not to be packaged. It should be noted that the files to be packaged in step S309 may include the picture file, sound file, etc. in addition to the subtitle file 10.

Next, the content creator-side system 2 stores the subtitle file 10 packaged in step S309 and private key encrypted with the public key generated in step S308 into a recording medium, and sends the recording medium to the user-side system 3.

Note that the content creator-side system 2 may include the private key encrypted with the user's private key in the subtitle file 10 having the encryption information embedded therein under the agreement with the user-side system 3. The files may be distributed from the content creator-side system 2 to the user-side system 3 via a recording medium having the files recorded therein as well as via a network.

Next in step S310, the content creator-side system 2 registers the font file 12 encrypted in step S307 and encryption information generated for each user in step S308 into a font information data base 311.

Upon reception of the distributed files, the user-side system 3 stores the key for decryption of the subtitle file (XML file 11) and font file 12 into its own storage unit in step S312.

Next in step S313, the user-side system 3 checks if the encryption information is described in the XML file 11.

In case the XML file 11 is determined to have the encryption information described therein (YES in step S313), the use-side system 3 goes to step S314 in which it will inquire the font information data base 311 at the content creator-side system 2 whether the font may be used or not.

In case the user-side system 3 has a response that the font may be used from the font information data base 311 (YES in step S314), it downloads the encrypted font file 12 from the font information data base 311 via the network in step S315.

In case the font file 12 has successfully been downloaded (YES in step S315), the user-side system 3 goes to step S316 in which it will decrypt the key received in step S312 with a private key in pair with the user's public key.

In case the key has successfully been decrypted (YES in step S316), the user-side system 3 goes to step S317 in which it will decrypt the font file 12 with the decrypted key.

In case the font file 12 has successfully been decrypted (YES in step S317), the user-side system 3 goes to step S318 in which it will generate a subtitle using the decrypted font file 12.

On the contrary, in case the encryption information is not found in the XML file 11 (NO in step S313), in case a response that the font file 12 may not be used is received (NO in step S314), in case the font file 12 has not successfully been downloaded (NO in step S315), in case the key has not successfully been decrypted (NO in step S316) or in case the encrypted font file 12 has not successfully been decrypted (NO in step S317), the user-side system 3 generates a subtitle using the local font held by the user's storage unit in step S319.

Then in step S320, the user-side system 3 combines the subtitle generated in step S318 or S319 with the picture and displays the synthetic image at the picture display unit 300.

Note that the content information data base 311 may not always be provided at the content creator-side system but the copyright holder of a font file may have a content information data base 311 to provide data to a content creator and users.

Also, since the above subtitle encryption and display can be effected as software in a general-purpose personal computer (PC), so the content creator-side system 2 does not needs any special apparatus. For the security of data, however, the user-side system 3 should desirably use dedicated hardware for decryption of encrypted data.

Content Decoder

The content decoder 100 having the subtitle decoding function is constructed as will be described below with reference to FIG. 9.

Figure 9:
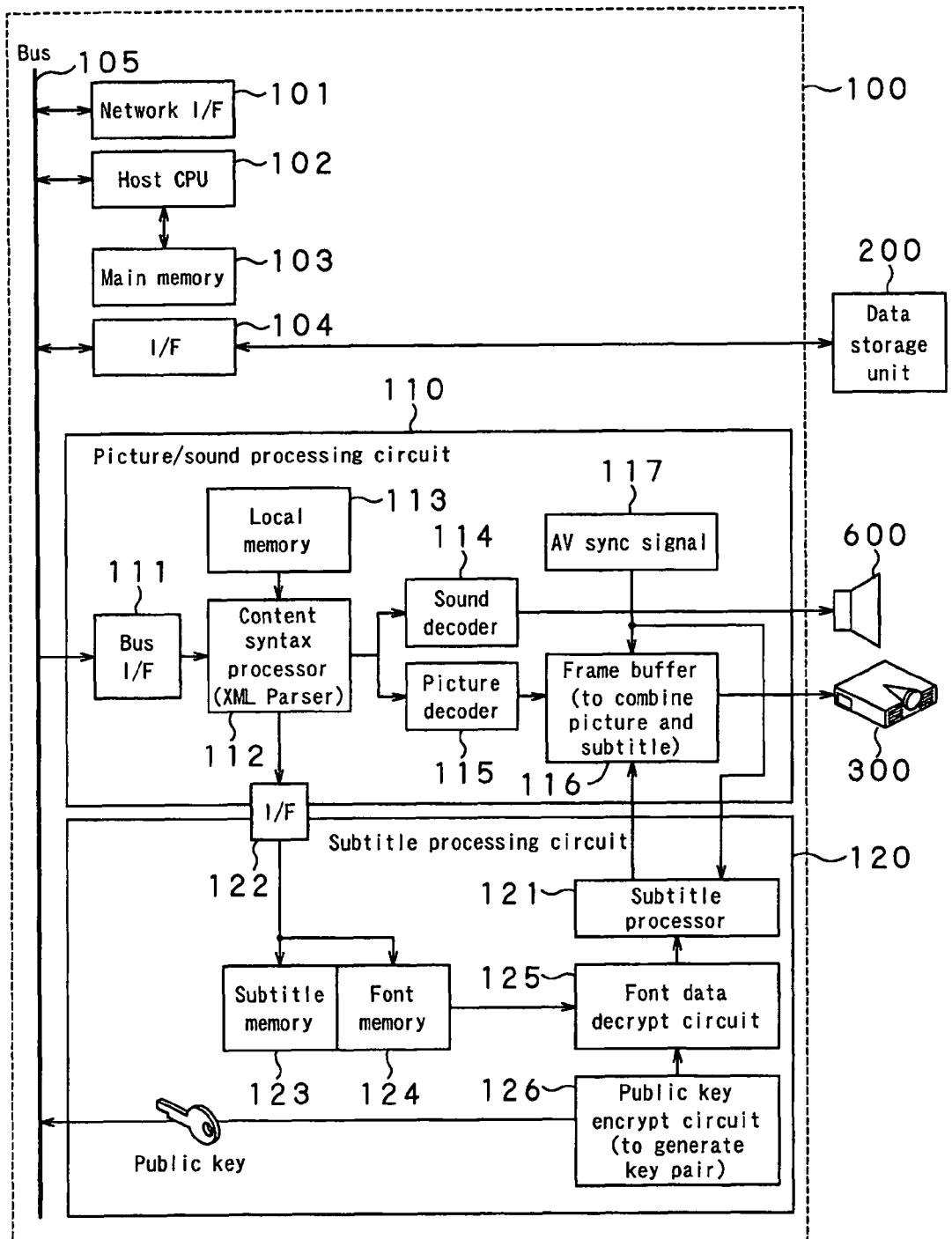
FIG. 9 is a schematic block diagram of a content decoder having a subtitle decoding circuit provided therein.

As shown in FIG. 9, the content decoder 100 includes a first network interface 101 for communication with other system components via the control computer 400 and network, host CPU (central processing unit) 102, main memory 103 as a working memory of the host CPU 102, and an interface circuit 104 for communication with the data storage unit 200.

Also, the content decoder 100 includes a picture/sound processing circuit 110 to analyze control data etc. and decode a picture and sound, and a subtitle processing circuit 120.

Also in the content decoder 100, there is provided a bus 105 having connected thereto the network interface 101, host CPU 102, interface circuit 104, picture/sound processing circuit 110 and subtitle processing circuit 120. Communications are made among these components under the control of the host CPU 102.

As shown, the picture/sound processing circuit 110 includes a bus interface 111 for communication with he bus 105, a content syntax processor 112 to interpret content syntax of input and output data and judge whether the data is a picture, sound or subtitle and appropriately distribute the data, a local memory 113 as a working memory of the content syntax processor 112, a sound decoder 114 to decode sound, a picture decoder 115 to decode a picture, a frame buffer (picture/subtitle synthesizer) 116 to provisionally store a picture decoded by the picture decoder 115 and combine the stored picture with a subtitle image processed by the subtitle processing circuit 120, and an AV sync generator 117 to generate a picture and sound sync signal.

As shown, the subtitle processing circuit 120 includes a subtitle processor 121 to decode and depict a subtitle, an interface circuit 122 to receive subtitle data from the content syntax processor 112, a subtitle memory 123 to store data on a subtitle yet to decode, received from the data storage unit 200, a font memory 124 to store an encrypted font file 12, a decryption unit 125 to decrypt the font data, and a public key encryption circuit 126 to generate a pair of public and private keys.

The public key the user first sends to the content creator is generated in pair with the decryption-use private key by the public key encryption circuit 126 in the content decoder 100. The public key thus generated is distributed to the content creator via a network, recording medium or the like.

The data prepared by the content creator is passed to the content syntax processor 112 in the picture/sound processing circuit 110 via the bus 105 from the network interface 101 or data storage unit 200. The content syntax processor 112 in the picture/sound processing circuit 110 makes content syntax processing of the data to analyze a picture file, sound file and subtitle file 11, and supply the picture file to the picture decoder 115 while supplying the sound file to the sound decoder 114. The content syntax processor 112 stores the XML file 11 of the subtitle file 10 into the subtitle memory 123 of the subtitle processing circuit 120 via the local interface 122. Also, it stores the font file 12 of the subtitle file 10 into the font memory 124 of the subtitle processing circuit 120 via the local interface 122.

In case the font file 12 stored in the font memory 124 is an encrypted one, the font data decryption circuit 125 decrypts the font file 12 with the private key in the key pair pre-generated by the public key encryption circuit 126.

The subtitle processor 121 uses the font file 12 decrypted by the font data decryption circuit 125 and XML file 11 stored in the subtitle memory 123 to generate a subtitle, and writes the subtitle into the frame buffer 116 for display at the picture display unit 300.

Using a sync signal generated by the AV sync signal generator 117, the frame buffer 116 synchronizes the picture signal output from the picture signal processor 115 and subtitle output from the subtitle processor 121 with each other to display the picture and subtitle at the picture display unit 300. Also, the sound data is similarly outputted from the sound output unit 600 in synchronism with the picture and subtitle.

Note that the public key encryption circuit 126 to generate a public key for the users may not always be provided in the subtitle processing circuit 120 unless there is any problem with the encryption security. For example, the circuit 126 may be provided in the picture/sound processing circuit 110 or connected directly to the bus 105. Also, in case the content decoder 100 can assure a sufficiently high security, the host CPU 102 may generate a public key pair and a private key be stored in an external storage unit 200 such as a hard disk or the like, and the public key encryption circuit may be implemented by software.

Other Example of the Construction of the Content Decoder

Note that the subtitle processing circuit 120 may not be incorporated in the content decoder 100 but may be in the picture display unit 300 such as a projector, monitor or the like.

Figure 10:
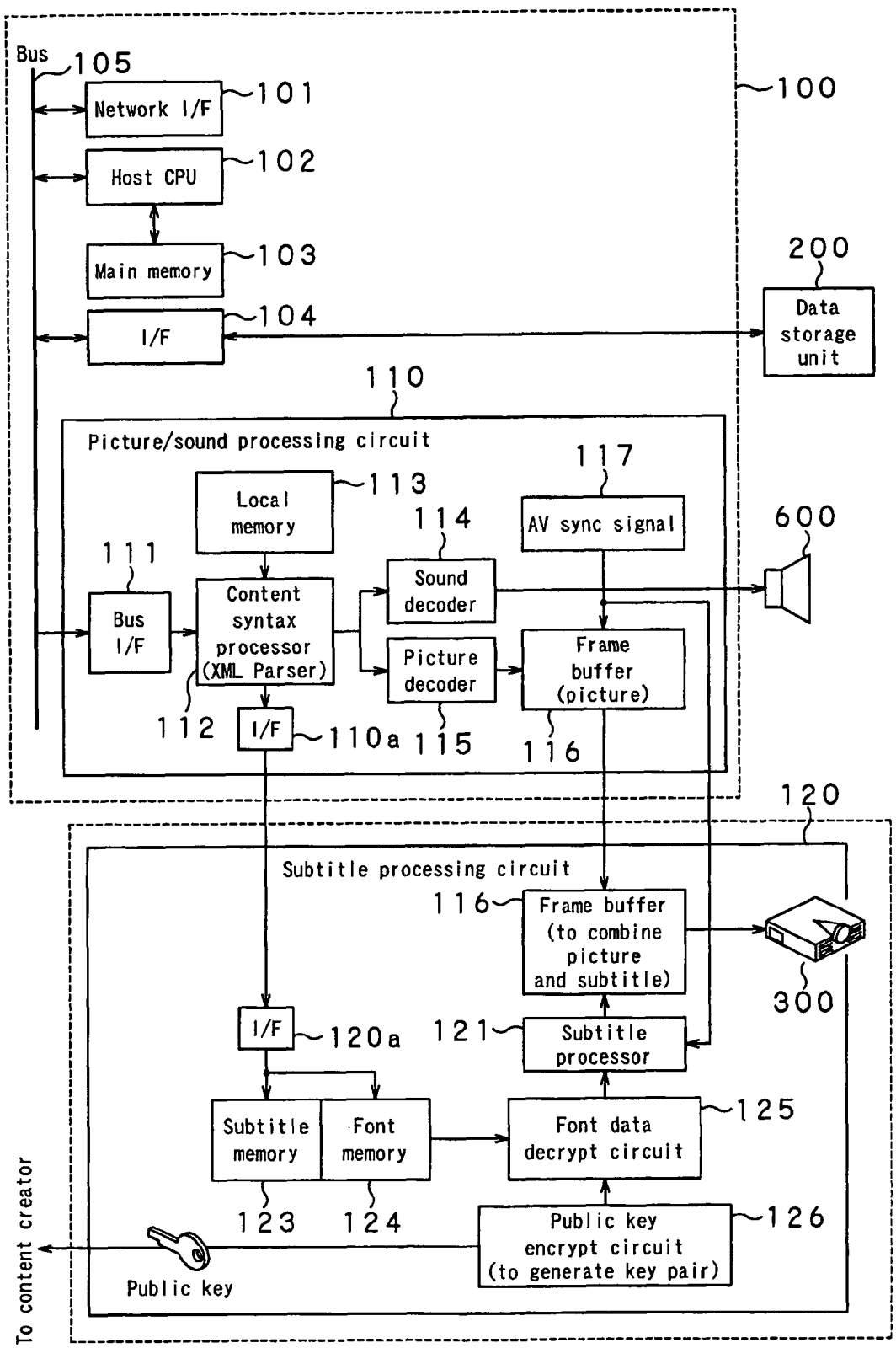
FIG. 10 is also a schematic block diagram of the content decoder and picture display unit having a subtitle decoding circuit provided therein.

FIG. 10 is also a schematic block diagram of the content decoder 100 and picture display unit 300 having the subtitle processing circuit 120 provided therein.

In case the subtitle processing circuit 120 is incorporated in the picture display unit 300, the subtitle processing circuit 120 has a frame buffer 127 additionally provided therein as shown in FIG. 10.

Also in the above case, interface circuits 110a and 120a to transfer data from the content syntax processor 112 to the subtitle processing circuit 120 are provided in the picture/sound processing circuit 110 and subtitle processing circuit 120, respectively.

The public key the user first sends to the content creator is generated in pair with the decryption-use private key by the public key encryption circuit 126 in the content decoder 100. The public key thus generated is distributed to the content creator via a network, recording medium or the like.

The data created by the content creator is passed to the content syntax processor 112 in the picture/sound processing circuit 110 via the bus 105 from the network interface 101 or data storage unit 200. The content syntax processor 112 of the picture/sound processing circuit 110 makes content syntax processing of the data, analyzes the picture file, sound file and subtitle file 11, and supplies the picture file to the picture decoder 115 while supplying the sound file to the sound decoder 114. The content syntax processor 112 stores the XML file 11 of the subtitle file 10 into the subtitle memory 123 of the subtitle processing circuit 120 via the interface circuits 110a and 120a. Also, it stores the font file 12 of the subtitle file 10 into the subtitle memory 123 of the subtitle processing circuit 120 via the interface circuits 110a and 120a.

In case the font file 12 stored in the font memory 124 is an encrypted one, the font data decryption circuit 125 decrypts the font file 12 with the private key in the key pair pregenerated by the public key encryption circuit 126.

Using the font file 12 decrypted by the font data decryption circuit 125 and XML file 11 stored in the subtitle memory 123, the subtitle processor 121 generates a subtitle, and writes it into the frame buffer 127 in the subtitle processing circuit 120 for displaying the generated subtitle at the picture display unit 300.

At the same time, the picture stored in the frame buffer 116 in the content decoder 100 is also transferred to the frame buffer 127 in the subtitle processing circuit 120.

Using the sync signal generated by the AV sync signal generator 117, the frame buffer 127 in the subtitle processing circuit 120 synchronizes the picture signal output from the picture decoder 115 and subtitle output from the subtitle processor 121 with each other to display them at the picture display unit 300. Similarly, the sound data is outputted from the sound output unit 600 synchronously with the picture signal.

EFFECT OF THE INVENTION AND OTHER APPLICATIONS

As above, the encryption of the font file 12 prepared separately from the XML file 11 as the main file of a subtitle permits to safely distribute the font file 12 for the standpoint of intellectual property protection, and permits the font maker to distribute the font file 12 for use in a digital movie screening.

Also, the above encryption of the font file 12 permits the content creator to implement a variety of image representation, and thus to shift from the conventional film movies to the digital movies.

Also, use of subtitle-dedicated fonts by the content creator for a subtitle in a digital movie permits the above encryption of the font file 12 permits the user to have an improved legibility of the subtitle.

Implementation of the digital subtitle advantageous to all the font copyright holder, content creator and user as above will promote the prevalence of the digital movie screening as a business.

Also, since the high-quality digital subtitle is usable for showing a language translated from an original language used in a movie as well as for a great assistance to the hearing- or visually-impaired people, the digital movie will be accepted by more users.

Also, the present invention is applicable to various uses requiring high-quality fonts as well as to the movie subtitle. Since an encrypted font file can be used in a picture display apparatus, the copyright holder of font data will be able to positively widen his or her business of providing font files.

The above uses to which the present invention is applicable will be explained below:

Digital Advertisement

With application of the present invention, it is possible to provide an image representation using quality font data in the image advertising signs generally called "digital signage" placed at street corners and in the shops.

Consumer Set Top Box

The present invention is also applicable to a consumer set-top box (STB) by which an image from a network or package image is displayed on a home TV. A higher-grade character representation can be made using the currently used built-in low-definition bit map font as well as high-quality font data.

High-Resolution TV

For example, a circuit using the subtitle processor 120 in the picture display unit shown in FIG. 10 can be built in a picture display unit such as a high-resolution TV set or the like. Namely, the present invention is applicable to a high-resolution TV, projector, etc. which are expected to be more prevalent in future.

Medicine

Since the present invention permits a quality character representation, it is applicable to an image diagnostic device used in the medical field to provide a medical imaging device or the like which can produce a highly legible image.

Electronic Dictionary

The font data having a high intellectual property value includes font data containing a large number of characters and many types of fonts, whose level is higher than the JIS second level. So, by the use of font data containing a large number of characters, high in intellectual property value and which could not be used in the conventional electronic dictionaries, it is possible to develop an electronic dictionary or the like easy to use.

Support Device for Physically Handicapped Person

The subtitle is usable for showing a language translated from an original language used in a movie as well as for assistance to the hearing- or visually-impaired people. In some movie or performing theaters, a dedicated subtitle display apparatus is available to the handicapped ones of the visitors. The present invention can provide a system to safely supply highly legible font data to the subtitle display apparatus. Also, the present invention is applicable to a character information display called "closed captions" which can be incorporated in a television set or the like.

Portable Devices

The recent portable devices such as mobile phone, PDA (portable digital assistant), digital camera, digital video device, digital audio device and personal digital picture display device has a higher-definition display. Since the display of such a portable device is smaller than that of the television set and personal computer, the fonts used in the display are required to have a higher legibility. The present invention is applicable to the subtitle display in such portable devices.

It should be understood by those skilled in the art that various modifications, combinations, sub-combinations and alterations may occur depending on design requirements and other factors insofar as they are within the scope of the appended claims or the equivalents thereof.

What is claimed is:

1. A character information generating apparatus, comprising:
    an encryption unit to encrypt a font file including data for displaying characters in a specific font; and
    a character information file generator to generate a character information file including a main file describing therein text data representing the content of characters to be displayed on a display unit and control data for displaying the characters and a font file encrypted by the encryption unit,
    wherein the character information file generator describes, in the main file, information indicating whether the font file is an encrypted file, the font file being indicated with a pointer, if any, described in the main file.

2. The character information generating apparatus according to claim 1, wherein the encryption unit encrypts the font file with a public key provided from the user using a display unit.

3. The character information generating apparatus according to claim 2, wherein the character information file is distributed to the user using a display unit via a recording medium or network.

4. A character information generating method, comprising the steps of:
    encrypting a font file including data for displaying characters in a specific font;
    generating a character information file including a main file describing therein text data representing the content of characters to be displayed on a display unit and control data for displaying the characters and an encrypted font file; and
    describing, in the main file, information indicating whether the font file is an encrypted file, the font file being indicated with a pointer, if any, described in the main file.

5. The character information generating method according to claim 4, wherein the font file is encrypted with a public key provided from the user using a display unit.

6. The character information generating method according to claim 5, wherein the character information file is distributed to the user using a display unit via a recording medium or network.

7. A character information display apparatus, comprising:
    a display unit capable of displaying at least character information; and
    a file acquisition unit to acquire, from a recording medium or network, a character information file including a main file describing therein text data representing the content of characters and control data for displaying the characters and an encrypted font file; and
    a decryption controller to decrypt the character information file acquired by the file acquisition unit and display characters in a predetermined font, obtained by decryption,
    the main file describing therein a pointer to indicate a font file and information indicating whether the font file indicated with the pointer is an encrypted file; and
    the decryption controller decrypting, in case the main file has described therein the information that the font file is the encrypted one, the font file with an encrypt key when the characters in that font are to be displayed.

8. The character information display apparatus according to claim 7, wherein:
    the font file has been encrypted with a public key provided from the decryption controller; and
    the decryption controller makes the decryption with a private key it holds.

9. The character information display apparatus according to claim 8, wherein in case an encrypted font file cannot be decrypted or in case the file acquisition unit cannot acquire any font file via the network, the decryption controller displays characters in reference to another font file, not to the font file in question.

10. A character information displaying method in which there is acquired, from a recording medium or network, a character information file including a main file describing therein text data representing the content of characters and control data for displaying the characters and an encrypted font file, the acquired character information is decrypted and characters in a predetermined font, obtained by decryption, are displayed on a display unit, wherein:
    the main file describes therein a pointer to indicate a font file and information indicating whether the font file indicated with the pointer is an encrypted file; and
    in case the main file has described therein the information that the font file is the encrypted file, the font file is decrypted with an encrypt key when the character in that font is to be displayed.

11. The character information displaying method according to claim 10, wherein:
    the font file has been encrypted with a public key provided from the decryption controller; and
    the decryption is made with a private key in pair with the public key.

12. The character information displaying method according to claim 11, wherein in case an encrypted font file cannot be decrypted or in case the file acquisition unit cannot acquire any font file via the network, characters are displayed in reference to another font file, not to the font file in question.

13. A digital movie screening method in which a content creator creates a picture file and subtitle file for a movie and a user decrypts the picture file and subtitle file, combines the decrypted picture and subtitle with each other and shows the synthetic picture/subtitle on a screen, wherein:
    the subtitle includes a main file describing therein text data representing the content of characters to be displayed as a movie subtitle and control data for displaying a subtitle and one or more font files including font data on the text data, the main file describing information indicating whether the one or more font files are encrypted files; and
    the content creator encrypts the font file and provides the subtitle file including the encrypted font file to the user.

14. A digital movie screening system, comprising:
a content creator-side system to create a picture file and subtitle file for a movie; and
a user-side system to decrypt the picture file and subtitle file supplied from the content creator-side system, combine the decrypted picture and subtitle with each other and showing the synthetic picture/subtitle on a screen,
the subtitle including a main file describing therein text data representing the content of characters to be displayed as a movie subtitle, control data for displaying a subtitle and one or more font files including font data on the text data, the main file describing information indicating whether the one or more font files are encrypted files; and
the content creator-side system encrypting the font file and providing the subtitle file including the encrypted font file to the user.

15. A subtitle display apparatus destined for use in a digital movie screening system in which a content creator creates a picture file and subtitle file for a movie and a user decrypts the picture file and subtitle file, combines the decrypted picture and subtitle with each other and shows the synthetic picture/subtitle on a screen, the subtitle display apparatus comprising:
a storage unit storing a movie subtitle file; and
a subtitle processor to decrypt the subtitle file and combine the decrypted subtitle with a picture of the movie,
the subtitle including a main file describing therein text data representing the content of characters to be displayed as a movie subtitle, control data for displaying a subtitle and one or more encrypted font files including font data on the text data, the main file describing information indicating whether the one or more font files are encrypted files; and
the subtitle processor including a cipher processor to decrypt the font file.

* * * * *